A. T. HESS.

Assignor to THE IOWA ELECTRICAL COMPANY.

HOTEL ANNUNCIATOR AND FIRE ALARM.

No. 10,711. Reissued Apr. 13, 1886.

Witnesses:
M. A. Anderson.
C. D. Hudgens.

Inventor:
Albert T. Hess,
By Thomas G. Orwig, Atty.

UNITED STATES PATENT OFFICE.

ALBERT T. HESS, OF DES MOINES, IOWA, ASSIGNOR TO THE IOWA ELECTRICAL COMPANY, OF SAME PLACE.

HOTEL-ANNUNCIATOR AND FIRE-ALARM.

SPECIFICATION forming part of Reissued Letters Patent No. 10,711, dated April 13, 1886.

Original No. 288,570, dated November 13, 1883. Application for reissue filed December 18, 1885. Serial No. 186,078.

*To all whom it may concern:*

Be it known that I, ALBERT T. HESS, a citizen of the United States, and a resident of Des Moines, in the county of Polk and State of Iowa, have invented an Improved Electric Hotel-Annunciator and Fire-Alarm, of which the following is a specification.

My improvement relates to my invention patented in the United States February 6, 1883, No. 271,707; and it consists, first, in combining relays and independent circuits and batteries with bells at remote distances from the main battery for the purpose of augmenting the power required to ring such remote bells more vigorously; second, in combining magnetic switch-sections with an insulated or non-conducting and adjustable switch plate or bar in such a manner as to adapt the complete switch to be used with two or more independent batteries and independent circuits collectively and simultaneously or separately and successively whenever it is desired or necessary, all as hereinafter fully set forth.

Figure 1:
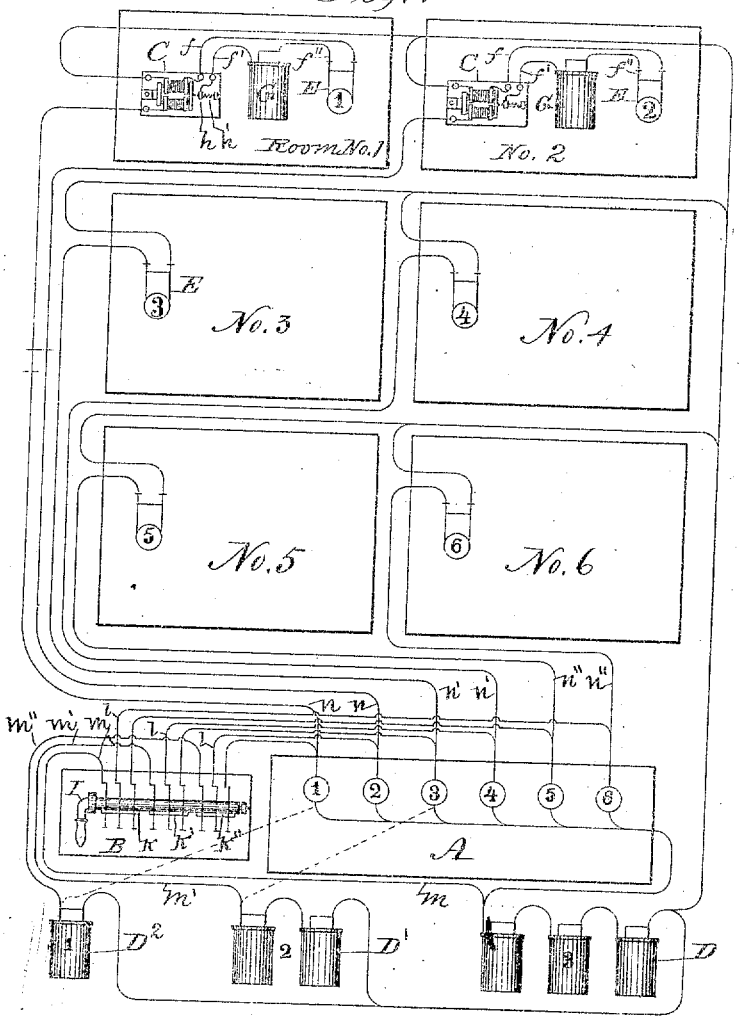
Figure 2:
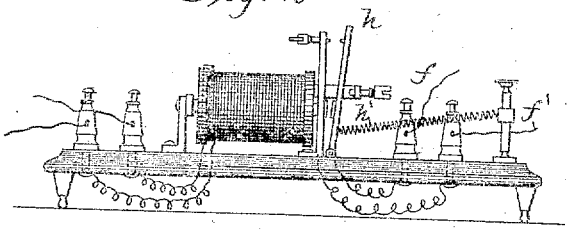

Figure 1 of my accompanying drawings is a plan view of my complete invention. Fig. 2 is a side view of a relay. Jointly considered they clearly illustrate the construction and operation of the complete apparatus.

A represents the base, that supports a series of push-button circuit-closers, Nos. 1 2 3 4 5 6, that are connected with a corresponding number of rooms in a building by means of wires in a common way.

B is the base of my switch, that is designed to be located near the push-button circuit-closers and the annunciator in the office or station where the clerk or operator has ready access thereto.

C C represent relays of common form, located in the remote rooms Nos. 1 and 2, and connected with the wires that extend to the push-buttons of corresponding numbers mounted on the base A in the office, and also with the wire that extends from said rooms to the main battery D.

E E are electric bells located in rooms Nos. 1 and 2, and connected with the relays by means of wires *f*.

G G are batteries in rooms Nos. 1 and 2, connected with the relays by means of wires *f'*, and with the bells E by wires *f''*, as required to establish auxiliary or independent circuits between the relays and the bells. When the wires or circuits between rooms and the main battery or batteries are so long as to offer too great resistance to the operation of the bells in remote rooms properly, the auxiliary batteries G in such rooms will aid in operating the bells by means of the relays C and local circuits whenever the main battery or batteries are operated in their usual manner to ring the bells. Such force will be sufficient to move the insulated pivoted bars *h* (that are held from the magnets in the relays by springs *h'*) to close the local circuits in said rooms with the relays and main circuits and batteries, and thus utilize the power of the auxiliary batteries G. Each spring *h'* in its normal condition holds the local circuit open by drawing the pivoted bar *h* against a piece of rubber or other non-conducting substance, that is held in place at the side of the pivoted bar by means of an adjustable-screw, as shown, or in any suitable way.

I represents my non-conducting switch-bar, hinged to the base B.

*k k' k''* are magnetic switch-sections, fixed to the hinged-bar and non-conductor I in such a manner that they will engage a number of wires, *l*, extended over the switch-bar, and within reach of the conducting magnetic sections *k k' k''*.

*m* is a wire that connects the switch-section *k* with the main battery D.

*m'* is a wire that connects the switch-section *k'* with the second battery, D'.

*m''* is a wire that connects the switch-section *k''* with the third battery, $D^2$.

*n n* are wires connecting the switch-section *k''* with the relays C in the rooms Nos. 1 and 2, and the push-buttons of corresponding numbers on the base A.

*n' n'* are wires connecting the switch-section *k'* with the electric bells in rooms Nos. 3 and 4, and with push-buttons of corresponding numbers on the base A.

*n'' n''* are wires connecting the switch-section *k* with the bells in rooms Nos. 5 and 6, and with push-buttons of corresponding numbers on the base A. The power of the battery $D^2$ is thus conducted to the relays C in rooms Nos. 1 and 2.

To aid in operating the bells in those remote rooms, the power of battery D′ is carried to the rooms Nos. 3 and 4, and of battery D to rooms Nos. 5 and 6, when the switch is turned up to allow the switch-sections $k\ k'\ k''$ to engage the wires $l$, that are connected with the wires $n$, $n'$, and $n''$, and as required to utilize the combined force of all the batteries in simultaneous ringing of the bells to alarm the inmates of all the rooms. The power of distinct batteries is thus conveyed by means of one switch to distinct rooms in such a manner that the electric force of the complete apparatus may be more uniformly distributed throughout a building, and the bells in the different rooms sounded with force and distinctness. The force of the main battery D, that is designed to be connected with the push-buttons and the annunciator in the office or station and the push-buttons and bells E in each room, (when my compound switch is turned down,) as required to signal to and from the rooms successively, can, by means of my compound switch, be concentrated to simultaneously operate the bells in a portion of the rooms, while the power of the independent or auxiliary batteries D′ and $D^2$, or any number desired, may be also operated simultaneously by the same switch to simultaneously ring the bells in the other portions of the building.

To prevent the auxiliary batteries from being neglected and becoming inoperative, I keep them in daily use by connecting each one of them with one or more push-buttons on the base A, and disconnecting the said push-buttons from the series, as indicated by dotted lines in the drawings, so that each battery may be used daily for signaling to and from one or more rooms, and also used jointly with all the other batteries by means of my compound switch, as required to ring all the bells in the building simultaneously for alarm purposes.

I claim as my invention—

1. The non-conducting hinged bar I, carrying a series of electric conductor switch-sections, $k\ k'\ k''$, in combination with the series of wires $l$, the wires $m$, $m'$, and $m''$, the series of batteries D D′ $D^2$, and corresponding series of wires, $n\ n'\ n''$, and bells E, substantially as and for the purposes set forth.

2. In an electric annunciator and alarm, the combination of the hinged switch I $k\ k'\ k''$, the wires $l\ m\ m'\ m''$, a series of batteries, D D′ $D^2$, a series of wires, $n\ n'\ n''$, a relay, C, a battery, G, a bell, E, and wires $f\ f'\ f''$, substantially as shown and described, to operate in the manner set forth, for the purposes specified.

3. In an electric annunciator and alarm, the combination of two or more batteries, two or more electric circuits, a series of circuit-closers in an office or station, a series of bells in a series of rooms or separate points, an electric switch, and one or more relays at remote points from the batteries, to operate in the manner set forth, for the purposes specified.

4. In an electric annunciator and alarm, the combination of two or more batteries, two or more electric circuits, a series of circuit-closers in an office or station, a series of bells in a series of rooms or separate points, and an electric switch, to operate in the manner set forth, for the purposes specified.

ALBERT T. HESS.

Witnesses:
M. A. ANDERSON,
THOMAS G. ORWIG.